(12) United States Patent
Lee et al.

(10) Patent No.: US 12,468,339 B2
(45) Date of Patent: Nov. 11, 2025

(54) HINGE ASSEMBLY AND CASING ASSEMBLY FOR ELECTRONIC DEVICE

(71) Applicant: Getac Technology Corporation, New Taipei (TW)

(72) Inventors: Kun-Cheng Lee, Taipei (TW); Juei-Chi Chang, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 177 days.

(21) Appl. No.: 18/142,084

(22) Filed: May 2, 2023

(65) Prior Publication Data

US 2024/0241540 A1    Jul. 18, 2024

(30) Foreign Application Priority Data

Jan. 18, 2023  (CN) .......................... 202310073077.0

(51) Int. Cl.
*G06F 1/16* (2006.01)

(52) U.S. Cl.
CPC ............ *G06F 1/162* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 7,308,733 | B2 * | 12/2007 | An ........................ | G06F 1/1683 248/278.1 |
| 10,817,017 | B2 * | 10/2020 | Honda ................. | H05K 5/0247 |
| 2005/0207104 | A1 * | 9/2005 | Love ....................... | G06F 1/162 16/221 |
| 2006/0282985 | A1 * | 12/2006 | Lu ......................... | G06F 1/1681 16/367 |
| 2008/0078061 | A1 | 4/2008 | Hsu et al. | |
| 2008/0120805 | A1 | 5/2008 | Su | |
| 2010/0005626 | A1 | 1/2010 | Wang et al. | |
| 2012/0324675 | A1 | 12/2012 | Huang et al. | |

(Continued)

FOREIGN PATENT DOCUMENTS

| | | |
|---|---|---|
| CN | 109654114 A | 4/2019 |
| TW | 201012361 A | 3/2010 |
| TW | I323399 B | 4/2010 |

(Continued)

OTHER PUBLICATIONS

IP Australia, ER-AU2023203389. May 30, 2024.

(Continued)

*Primary Examiner* — Hung S. Bui
*Assistant Examiner* — Elisa Sasserath
(74) *Attorney, Agent, or Firm* — troutman pepper locke; Tim Tingkang Xia, Esq.

(57) ABSTRACT

A hinge assembly includes a fixed frame, a shaft, a rotatable frame and a cover. The shaft is rotatably disposed on the fixed frame. The rotatable frame is fixed to the shaft, and the rotatable frame has a first positioning structure. The cover is at least partially located between the rotatable frame and the fixed frame and sleeved on the shaft. The fixed frame or the cover has at least one second positioning structure, and the first positioning structure and the at least one second positioning structure are cooperated with each other so as to limit a rotatable range of the rotatable frame.

8 Claims, 13 Drawing Sheets

(56) References Cited

U.S. PATENT DOCUMENTS

2013/0162128 A1   6/2013  Yu

FOREIGN PATENT DOCUMENTS

| TW | I688323  B | 3/2020 |
| TW | I715440  B | 1/2021 |
| TW | M614529 U | 7/2021 |

OTHER PUBLICATIONS

YouTube video clip entitled "GETAC V110 Rugged Convertible Laptop—Product Overview,", uploaded on Sep. 29, 2016 by user "Camtech Systems Ltd". Retrieved from Internet: <https://www.youtube.com/watch?v=ELM_2BpYV1c>.
Taiwan Patent Office, "Office Action", Sep. 13, 2023, Taiwan.
International Search Report, Nov. 15, 2023, Germany.

* cited by examiner

HINGE ASSEMBLY AND CASING ASSEMBLY FOR ELECTRONIC DEVICE

CROSS-REFERENCE TO RELATED APPLICATIONS

This non-provisional application claims priority under 35 U.S.C. § 119(a) on Patent Application No(s). 202310073077.0 filed in China on Jan. 18, 2023, and the entire contents of which are hereby incorporated by reference.

TECHNICAL FIELD

The disclosure relates to a hinge assembly and a casing assembly for electronic device including the same.

BACKGROUND

As technology develops and progresses, twistable notebook computers are developed. In a twistable notebook computer, after a monitor of the notebook computer is pivoted away from a host of the notebook computer (i.e., the notebook computer is opened), the monitor can be turned right or left relative to the host, such that the monitor can face the user in front of the notebook computer or face the left-hand or right hand side of the user in front of the notebook computer.

In order to prevent the monitor from being improperly closed and prevent wires connecting the monitor and the host from being damaged due to the excessive turn of the monitor relative to the host, the notebook manufacturer may provide a stopper fixed on a shaft located between the monitor and the host. However, the fixation strength of the stopper on the shaft is weak, such that after the monitor has been turned many times, the stopper may gradually be movable relative to the shaft, causing the stopper failure. Therefore, how to solve the aforementioned issue is one of the crucial topics in this field.

SUMMARY

The disclosure provides a hinge assembly and a casing assembly for an electronic device which are capable of maintaining the effect of preventing the monitor from being overly turned so as to prevent the wires from being damaged due to overly twisted.

One embodiment of the disclosure provides a hinge assembly. The hinge assembly includes a fixed frame, a shaft, a rotatable frame and a cover. The shaft is rotatably disposed on the fixed frame. The rotatable frame is fixed to the shaft, and the rotatable frame has a first positioning structure. The cover is at least partially located between the rotatable frame and the fixed frame and sleeved on the shaft. The fixed frame or the cover has at least one second positioning structure, and the first positioning structure and the at least one second positioning structure are cooperated with each other so as to limit a rotatable range of the rotatable frame.

Another embodiment of the disclosure provides a casing assembly for electronic device. The casing assembly includes a first casing, a second casing and a hinge assembly. The hinge assembly includes a fixed frame, a shaft, a rotatable frame and a cover. The fixed frame is fixed to the first casing. The shaft is rotatably disposed on the fixed frame. The rotatable frame is fixed to the shaft and the second casing, and the rotatable frame has a first positioning structure. The cover is fixed to the first casing. The fixed frame or the cover has at least one second positioning structure, and the first positioning structure and the at least one second positioning structure are cooperated with each other so as to limit a rotatable range of the rotatable frame.

According to the hinge assembly and the casing assembly for the electronic device as described above, the cover is fixed to the first casing, and the fixed frame or the cover has the second positioning structure to be cooperated with the first positioning structure of the rotatable frame, such that the rotatable range of the rotatable frame can be limited. Since the fixed frame and the cover is fixed to the first casing instead of the shaft, when the second positioning structure of the fixed frame or the cover is hit by the first positioning structure, the fixed frame or the cover firmly fixed to the first casing enables the second positioning structure to have sufficient strength to stop the first positioning structure. Therefore, the fixed frame or the cover can permanently provide the effect of stopping the rotatable frame so as to prevent the wires from being damaged due to excessive twist.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
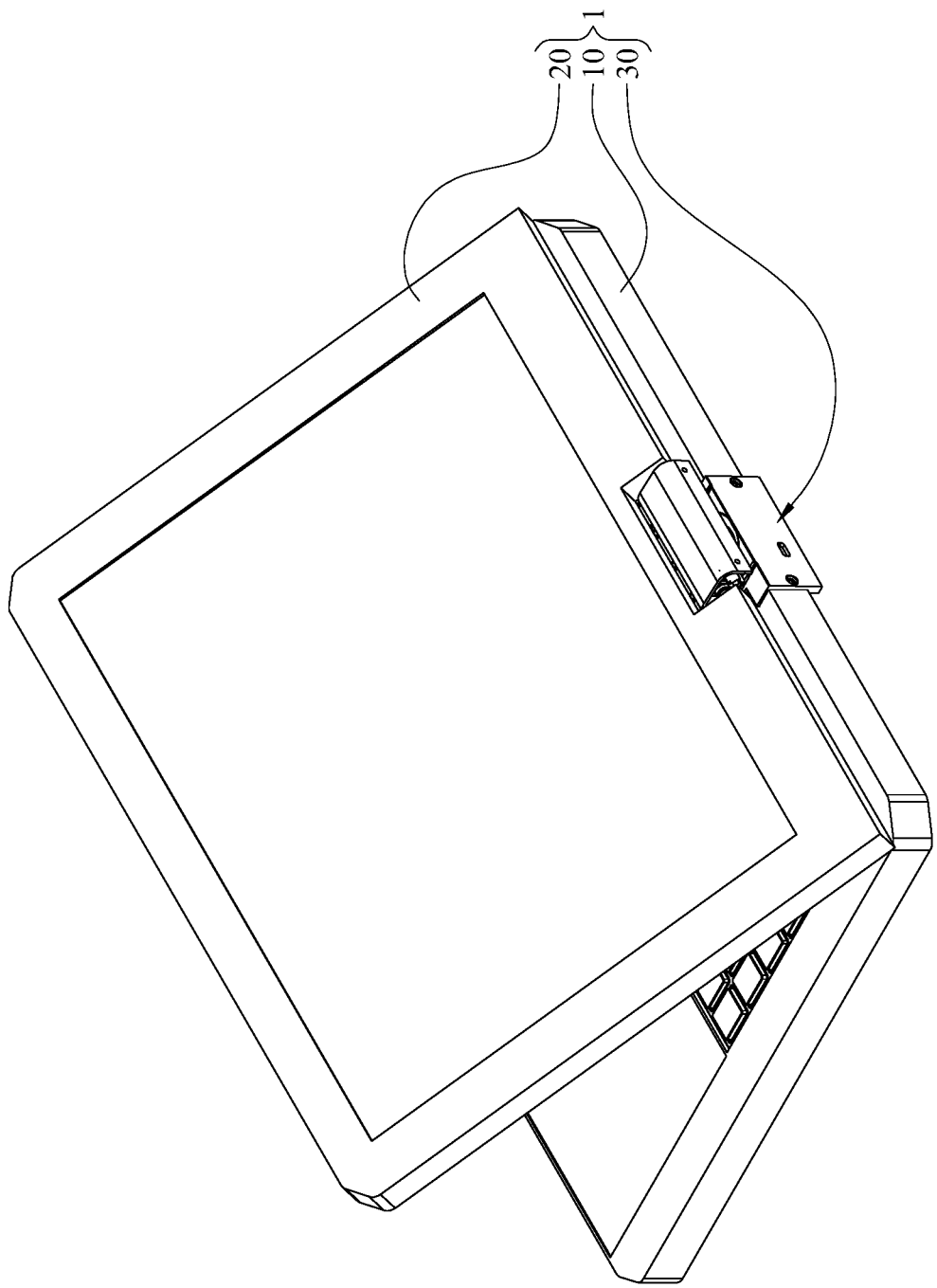
FIG. 1 is a perspective view of an electronic device including a casing assembly according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
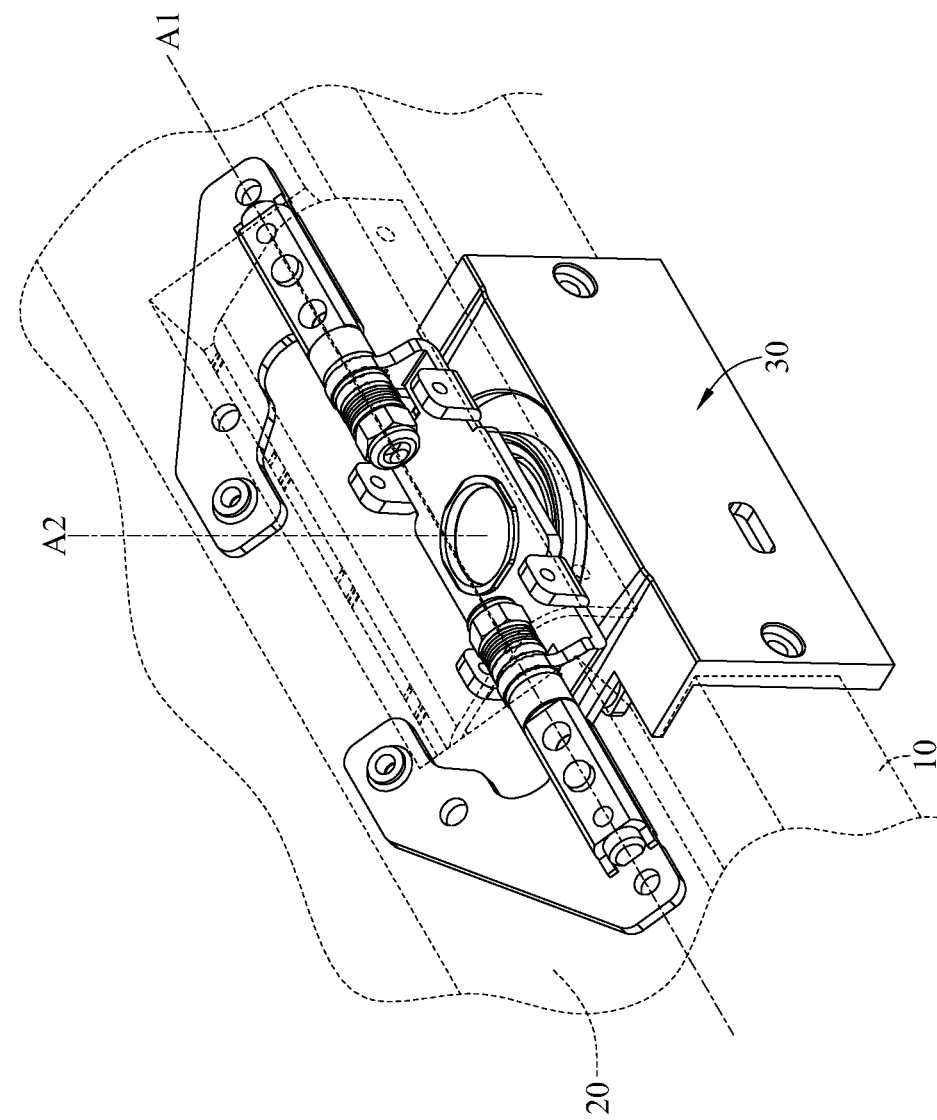
FIG. 2 is a partial perspective view of the casing assembly of the electronic device according to the one embodiment of the disclosure.
Figure 3:
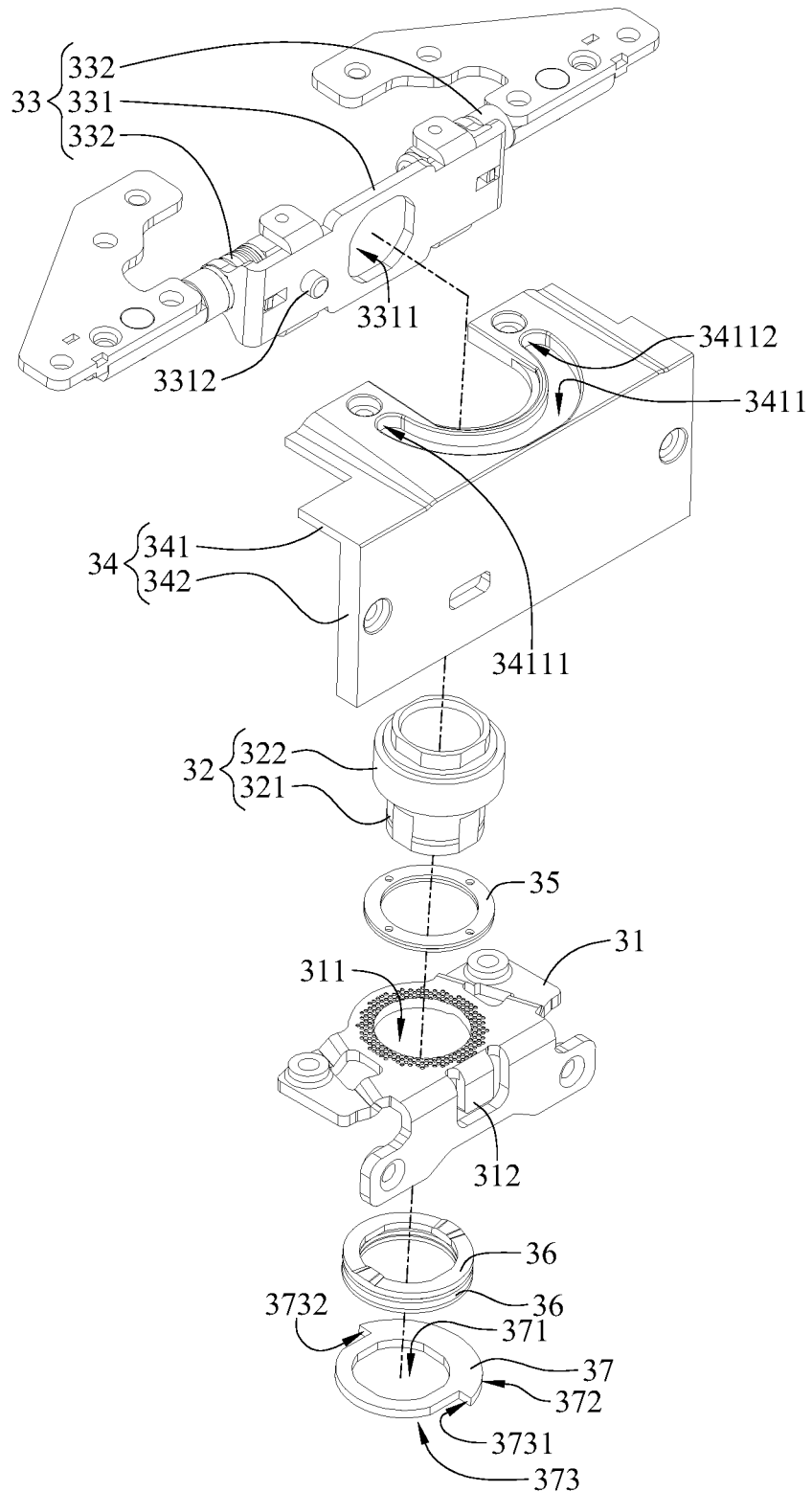
FIG. 3 is an exploded view of a hinge assembly in FIG. 2.

Referring to FIGS. 1 to 3, FIG. 1 is a perspective view of an electronic device 100 including a casing assembly 1 according to one embodiment of the disclosure, FIG. 2 is a partial perspective view of the casing assembly 1 of the electronic device 100 according to the one embodiment of the disclosure, and FIG. 3 is an exploded view of a hinge assembly 30 in FIG. 2.

In this embodiment, the casing assembly 1 of the electronic device 100 includes a first casing 10, a second casing 20 and a hinge assembly 30. The electronic device 100 is, for example, a notebook computer, the first casing 10 is, for example, a casing of a host, and the second casing 20 is, for example, a casing of a monitor, but the disclosure is not limited thereto. As long as an electronic device has two portions which are rotatable relative to each other, and the rotatable range between the two portions is required to be limited, such electronic device falls within the scope of the disclosure.

The hinge assembly 30 includes a fixed frame 31, a shaft 32, a rotatable frame 33 and a cover 34. In addition, the hinge assembly 30 may further include a first washer 35, a plurality of second washers 36 and a positioning plate 37.

Figure 4:
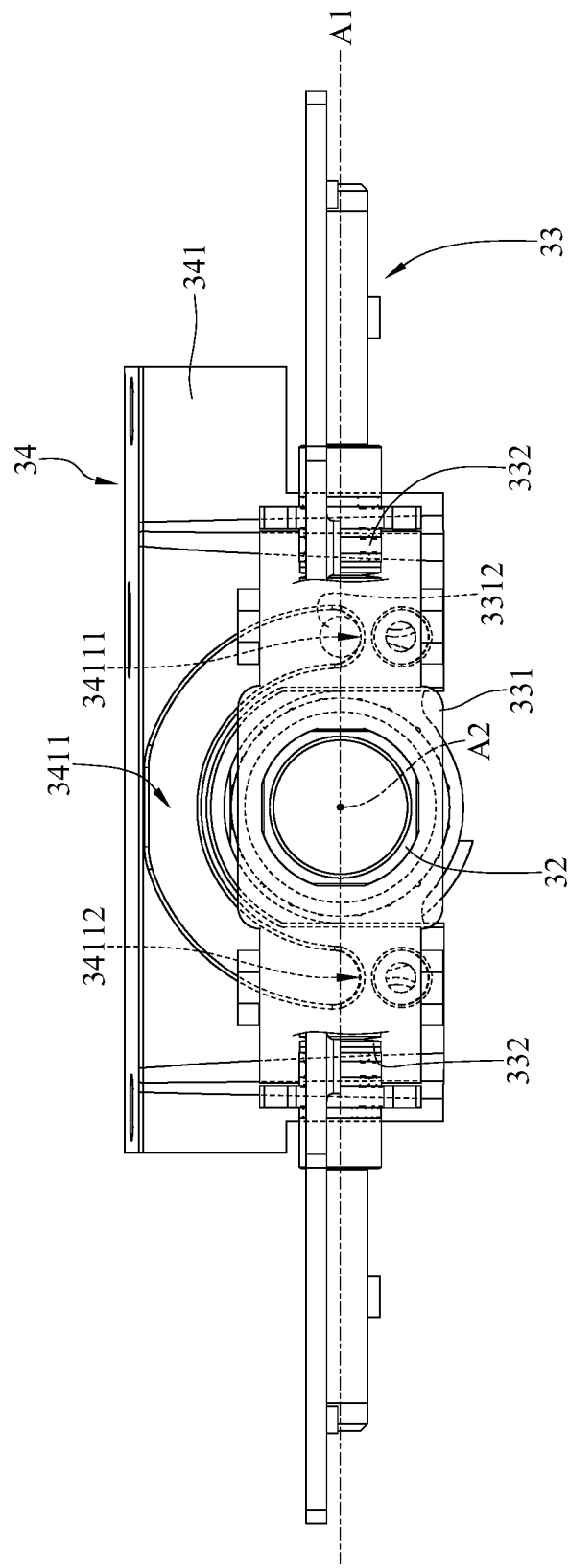
FIG. 4 is a top view of the hinge assembly in FIG. 3.
Figure 5:
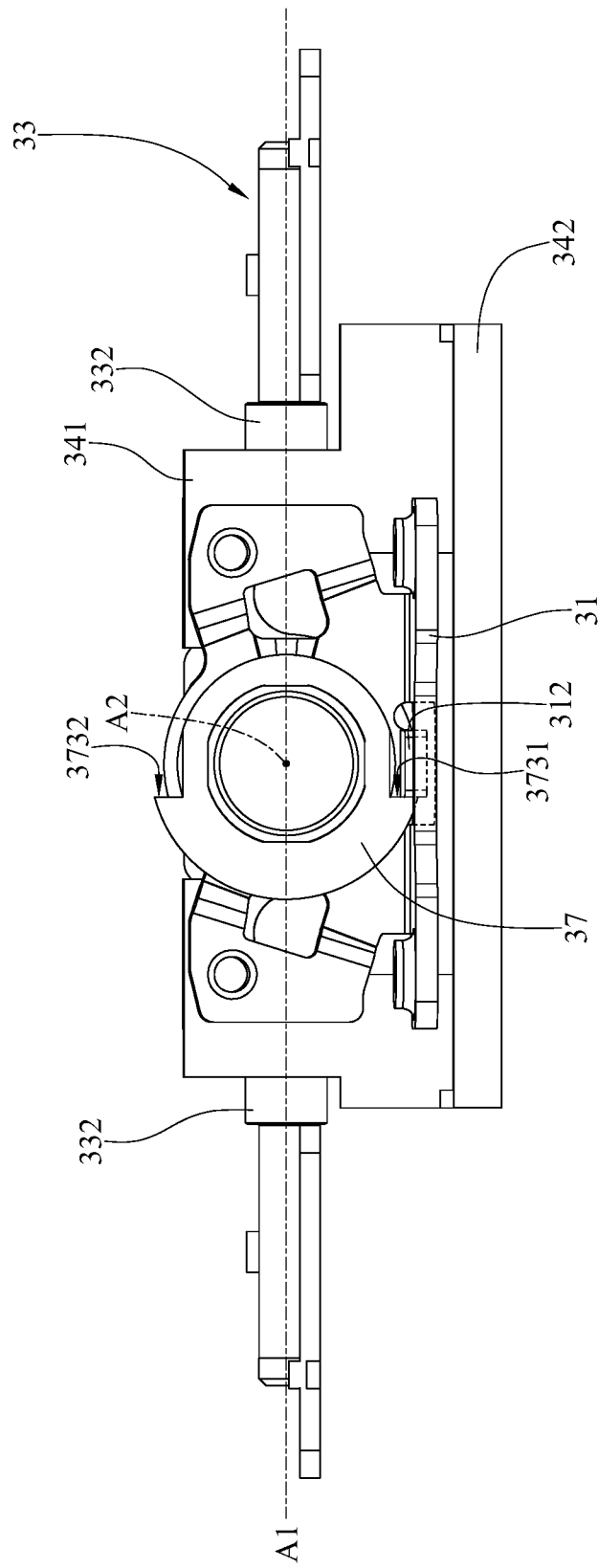
FIG. 5 is a bottom view of the hinge assembly in FIG. 3.

Then, referring to FIGS. 2 to 5, FIG. 4 is a top view of the hinge assembly 30 in FIG. 3, and FIG. 5 is a bottom view of the hinge assembly 30 in FIG. 3.

The fixed frame 31 is fixed to the first casing 10 via, for example, a fastener (not shown), such as a screw.

The shaft 32 includes a pillar portion 321 and a flange portion 322. The flange portion 322 radially protrudes from the pillar portion 321. The pillar portion 321 of the shaft 32 is sequentially disposed through the first washer 35, the fixed frame 31 and the second washers 36, and the pillar portion 321 of the shaft 32 is rotatable relative to the fixed frame 31. In this embodiment, a through hole 311 of the fixed frame 31 which the pillar portion 321 of the shaft 32 is disposed through is round hole, such that the fixed frame 31 is not fixed to the pillar portion 321 of the shaft 32, and thus the pillar portion 321 of the shaft 32 is rotatable relative to the fixed frame 31.

Note that the quantities of the first washer 35 and the second washers 36 of the hinge assembly 30 are not restricted in the disclosure and may be modified according to actual requirements.

The positioning plate 37 is sleeved on one end of the pillar portion 321 of the shaft 32 and fixed to the pillar portion 321 of the shaft 32, such that the first washer 35, the fixed frame 31 and the second washers 36 are positioned between the flange portion 322 of the shaft 32 and the positioning plate 37. In this embodiment, the positioning plate 37 is fixed to the pillar portion 321 of the shaft 32 via, for example, the cooperation of a non-round through hole 371 of the positioning plate 37 and the pillar portion 321 of the shaft 32 that match each other.

In this embodiment, the positioning plate 37 has an outer annular surface 372 and a curved notch 373 recessed from the outer annular surface 372. The fixed frame 31 has a positioning protrusion portion 312, and the positioning protrusion portion 312 is located in the curved notch 373.

The rotatable frame 33 includes a base 331 and two rotatable components 332. The base 331 is sleeved on another end of the pillar portion 321 of the shaft 32, and the base 331 is fixed to the pillar portion 321 of the shaft 32. In this embodiment, the base 331 is fixed to the pillar portion 321 of the shaft 32 via, for example, the cooperation of a non-round through hole 3311 of the base 331 and the pillar portion 321 of the shaft 32 that match each other. The rotatable components 332 are rotatably disposed on the base 331 and fixed to the second casing 20. A rotation axis A2 of the base 331 relative to the fixed frame 31 via the shaft 32 is perpendicular to a rotation axis A1 of the rotatable component 332 relative to the base 331. As a result, the second casing 20 can be turned relative to the first casing 10 about the axis A1 via the rotatable component 332. For example, the second casing 20 of the monitor can be pivoted away from or close to the first casing 10 of the host. Moreover, the second casing 20 can be turned relative to the first casing 10 about the axis A2 via the shaft 32. For example, the second casing 20 of the monitor can be turned relative to the first casing 10 of the host for allowing the monitor facing toward the host or facing away from the host.

The cover 34 is, for example, made of metal material. The cover 34 includes a horizontal plate 341 and a vertical plate 342. The horizontal plate 341 is fixed to the first casing 10 via, for example, a fastener (not shown), such as a screw. The horizontal plate 341 is sleeved on the shaft 32 and located between the base 331 of the rotatable frame 33 and the fixed frame 31. The vertical plate 342 stands on the horizontal plate 341 and fixed to the first casing 10 via, for example, a fastener, such as a screw. The vertical plate 342 may cover the fixed frame 31 and a part of the shaft 32. Note that the vertical plate 342 is an optional structure and may be omitted according to actual requirements.

In this embodiment, the base 331 of the rotatable frame 33 has a first positioning structure 3312. The first positioning structure 3312 is, for example, a protrusion. The first positioning structure 3312 is formed at a surface of the base 331 facing the horizontal plate 341. In addition, the horizontal plate 341 of the cover 34 has a second positioning structure 3411. The second positioning structure 3411 is, for example, a curved groove. The second positioning structure 3411 is formed at a surface of the horizontal plate 341 facing the base 331 of the rotatable frame 33. The first positioning structure 3312 is movably located in the second positioning structure 3411.

In this embodiment, the cooperation of two opposite inner surfaces 34111 and 34112 of the second positioning structure 3411 and the first positioning structure 3312 can limit a rotatable range of the shaft 32, and the cooperation of two opposite inner surfaces 3731 and 3732 of the curved notch 373 and the positioning protrusion portion 312 can also limit the rotatable range of the shaft 32.

Figure 6:
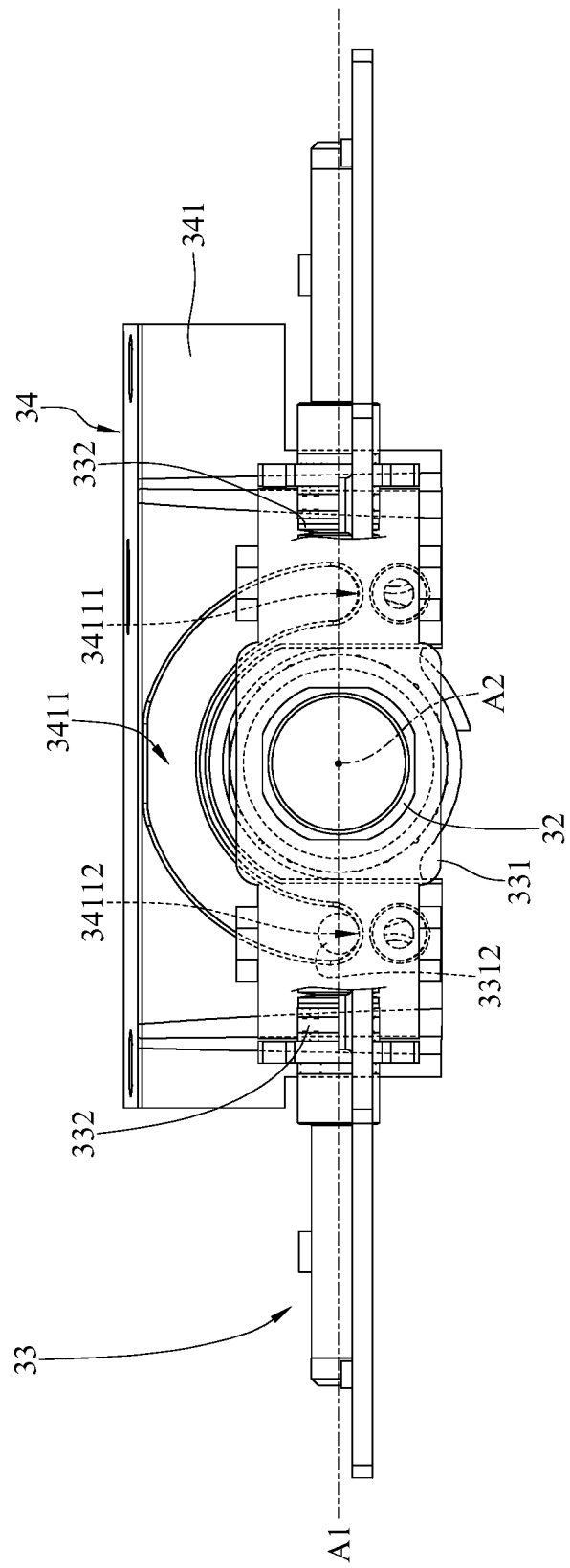
FIG. 6 is a top view of the hinge assembly in FIG. 3 when a rotatable frame of the hinge assembly is rotated.
Figure 7:
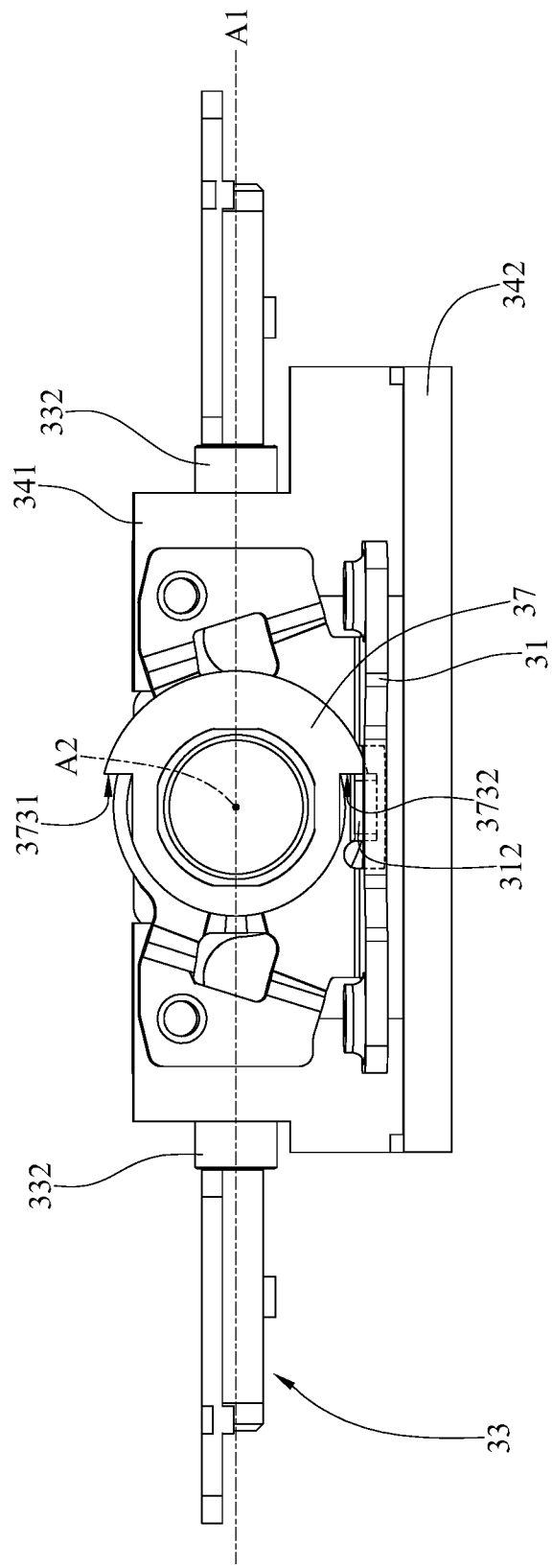
FIG. 7 is a bottom view of the hinge assembly in FIG. 3 when the rotatable frame of the hinge assembly is rotated.

Specifically, referring to FIGS. 4 to 7, FIG. 6 is a top view of the hinge assembly 30 in FIG. 3 when the rotatable frame 33 of the hinge assembly 30 is rotated, and FIG. 7 is a bottom view of the hinge assembly 30 in FIG. 3 when the rotatable frame 33 of the hinge assembly 30 is rotated.

As shown in FIGS. 4 and 5, the first positioning structure 3312 is in contact with the inner surface 34111 of the second positioning structure 3411, and the positioning protrusion portion 312 is in contact with the inner surface 3731 of the curved notch 373. As shown in FIGS. 6 and 7, the rotatable frame 33 can be rotated relative to the fixed frame 31 via the shaft 32 for moving the first positioning structure 3312 towards the inner surface 34112 of the second positioning structure 3411 and moving the inner surface 3732 of the curved notch 373 towards the positioning protrusion portion 312. Once the first positioning structure 3312 is in contact with the inner surface 34112 of the second positioning structure 3411, and the inner surface 3732 of the curved notch 373 is in contact with the positioning protrusion portion 312, the rotatable frame 33 is unable to be further rotated relative to the fixed frame 31 in the same direction.

Similarly, the rotatable frame 33 can be rotated relative to the fixed frame 31 via the shaft 32 for moving the first positioning structure 3312 towards the inner surface 34111 of the second positioning structure 3411 and moving the inner surface 3731 of the curved notch 373 towards the positioning protrusion portion 312. Once the first positioning structure 3312 is in contact with the inner surface 34111 of the second positioning structure 3411, and the inner surface 3731 of the curved notch 373 is in contact with the positioning protrusion portion 312, the rotatable frame 33 is unable to be further rotated relative to the fixed frame 31 in the same direction.

As a result, the cooperation of the second positioning structure 3411 and the first positioning structure 3312 and the cooperation of the curved notch 373 and the positioning protrusion portion 312 can limit the rotatable range of the rotatable frame 33 for preventing wires connecting the host with the monitor from being damaged due to excessive twist.

In this embodiment, the cover 34 is fixed to the first casing 10, and the cover 34 has the second positioning structure 3411 to be cooperated with the first positioning structure 3312 of the rotatable frame 33 so as to limit the rotatable range of the rotatable frame 33. Since the cover 34 is fixed to the first casing 10 instead of the shaft 32, when the second positioning structure 3411 of the cover 34 is hit by the first positioning structure 3312, the cover 34 firmly fixed to the first casing 10 enables the second positioning structure 3411 to have sufficient strength to stop the first positioning structure 3312. Therefore, the cover 34 can almost permanently provide the effect of stopping the rotatable frame 33 so as to prevent the wires from being damaged due to excessive twist.

In addition, the cooperation of the curved notch 373 of the positioning plate 37 and the positioning protrusion portion 312 of the fixed frame 31 can additionally help to limit the rotatable range of the rotatable frame 33. Note that the positioning plate 37 and the positioning protrusion portion 312 of the fixed frame 31 are optional component and structure. When the cooperation of the first positioning structure of the rotatable frame and the second positioning structure of the cover are already capable of sufficiently limiting the rotatable range of the rotatable frame, the positioning plate and the positioning protrusion portion of the fixed frame can be omitted.

On the other hand, the cover 34 made of metal material may have a stronger structural strength for permanently providing the effect of stopping the rotatable frame 33. Note that the material of the cover 34 is not restricted to being metal material and may be modified to being another material having a sufficient structural strength, such as plastic material.

In this embodiment, the first positioning structure 3312 is a protrusion, and the second positioning structure 3411 is a groove, but the disclosure is not limited thereto; in some other embodiments, the first positioning structure may be a groove, and the second positioning structure may be a protrusion.

Figure 8:
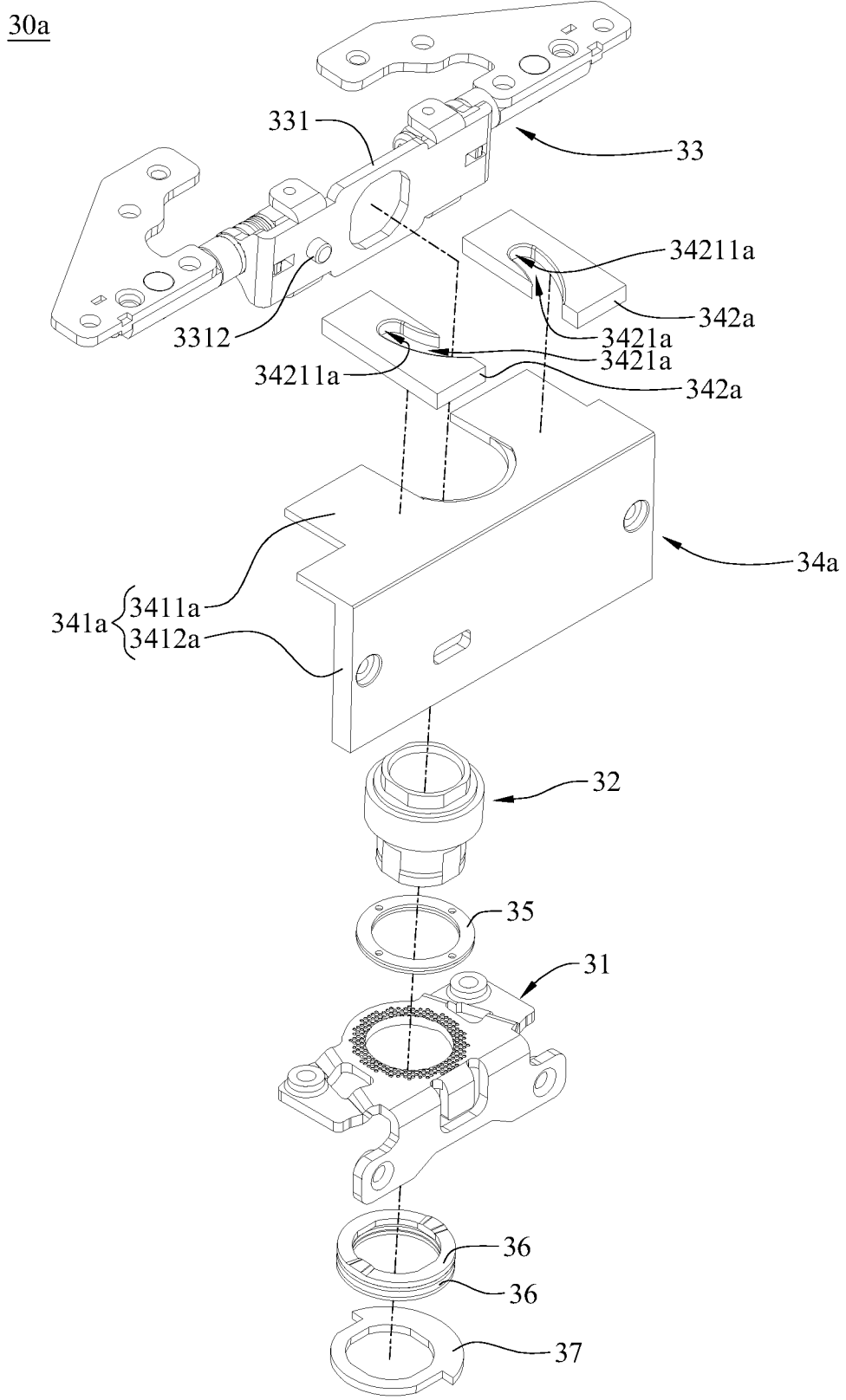
FIG. 8 is an exploded view of a hinge assembly according to another embodiment of the disclosure.
Figure 9:
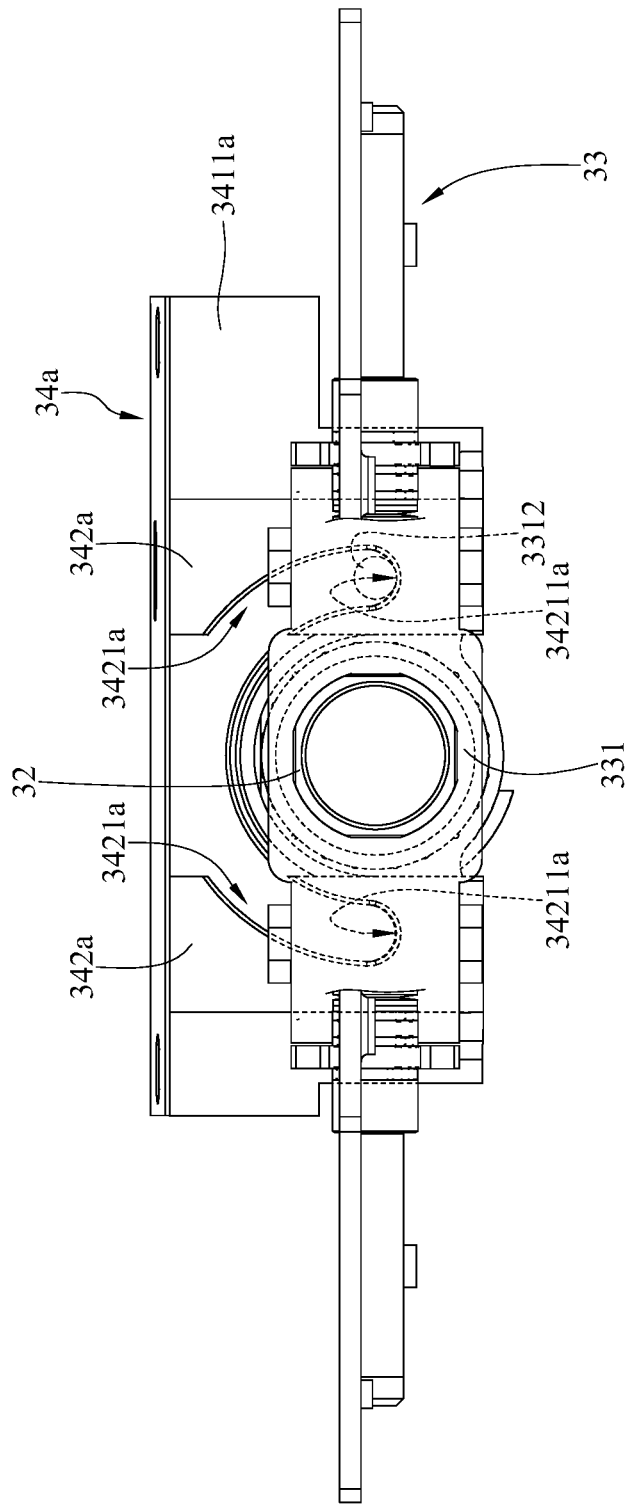
FIG. 9 is a top view of the hinge assembly in FIG. 8.

Then, referring to FIGS. 8 and 9, FIG. 8 is an exploded view of a hinge assembly 30a according to another embodiment of the disclosure, and FIG. 9 is a top view of the hinge assembly 30a in FIG. 8.

The hinge assembly 30a of this embodiment is similar to the hinge assembly 30 with reference to FIGS. 1 to 7. The hinge assembly 30a of this embodiment also includes a fixed frame 31, a shaft 32, a rotatable frame 33, a cover 34a, a first washer 35, a plurality of second washers 36 and a positioning plate 37. The main difference between the hinge assembly 30a and the hinge assembly 30 is the structure of the cover, and thus the following paragraphs mainly introduce the cover 34a of the hinge assembly 30a, and other components of the hinge assembly 30a can be referred to the previous paragraphs with reference to FIGS. 1 to 7 and will not be repeated introduced hereinafter.

In this embodiment, the cover 34a of the hinge assembly 30a includes a main part 341a and two mount parts 342a. The main part 341a is, for example, made of plastic material. The main part 341a includes a horizontal plate 3411a and a vertical plate 3412a. The horizontal plate 3411a is fixed to a first casing (e.g., the first casing 10 shown in FIG. 2), and the horizontal plate 3411a is located between the base 331 of the rotatable frame 33 and the fixed frame 31, and the vertical plate 3412a stands on the horizontal plate 3411a. The mount parts 342a are, for example, made of metal material. The mount parts 342a are mounted on the horizontal plate 3411a of the main part 341a. The mount parts 342a are located between the horizontal plate 3411a and the base 331 of the rotatable frame 33, and the two mount parts 342a are located at two opposite sides of the shaft 32.

In this embodiment, the first positioning structure 3312 of the base 331 of the rotatable frame 33 is, for example, a protrusion, and the first positioning structure 3312 is formed at a surface of the base 331 facing the two mount parts 342a. In addition, each of the mount parts 342a has a second positioning structure 3421a, and the second positioning structure 3421a is, for example, a positioning groove. The second positioning structures 3421a are respectively formed at surfaces of the mount parts 342a facing the base 331 of the rotatable frame 33. The first positioning structure 3312 is movable between two inner surfaces 34211a of the second positioning structures 3421a which are located opposite to each other. As a result, the cooperation of the first positioning structure 3312 and the second positioning structures 3421a can limit the rotatable range of the rotatable frame 33.

In this embodiment, the second positioning structures 3421a of the mount parts 342a do not form a continuous groove, such that, during the installation of the cover 34a, the rotatable frame 33 can be rotated to a position where the first positioning structure 3312 does not interfere with the mount parts 342a of the cover 34a for enabling the horizontal plate 3411a of the cover 34a can be directly sleeved on the shaft 32. Then, the rotatable frame 33 is rotated, such that the first positioning structure 3312 enters into the second positioning structure 3421a of one of the mount parts 342a. In other words, since the second positioning structures 3421a of the mount parts 342a do not form a continuous groove, during the installation of the cover 34a, the cover 34a is not required to be turned to a certain angle for enabling the first positioning structure 3312 to enter into the continuous groove, thereby facilitating the installation of the cover 34a.

In this embodiment, the rotatable range of the rotatable frame 33 is limited by the cooperation of the first positioning structure 3312 (e.g., the protrusion) of the base 331 of the rotatable frame 33 and the second positioning structures 3421a (e.g., the positioning grooves) of the mount parts 342a of the cover 34a, but the disclosure is not limited thereto; in some other embodiments, the cover may not include the two mount parts, while the rotatable frame may further include two mount parts. The two mount parts are mounted on the base of the rotatable frame and each have a first positioning structure (e.g., the positioning groove), and the horizontal plate of the cover may have a second positioning structure (e.g., the protrusion). As a result, the cooperation of the first positioning structures of the mount parts of the rotatable frame and the second positioning structure of the horizontal plate of the cover may also limit the rotatable range of the rotatable frame.

Figure 10:
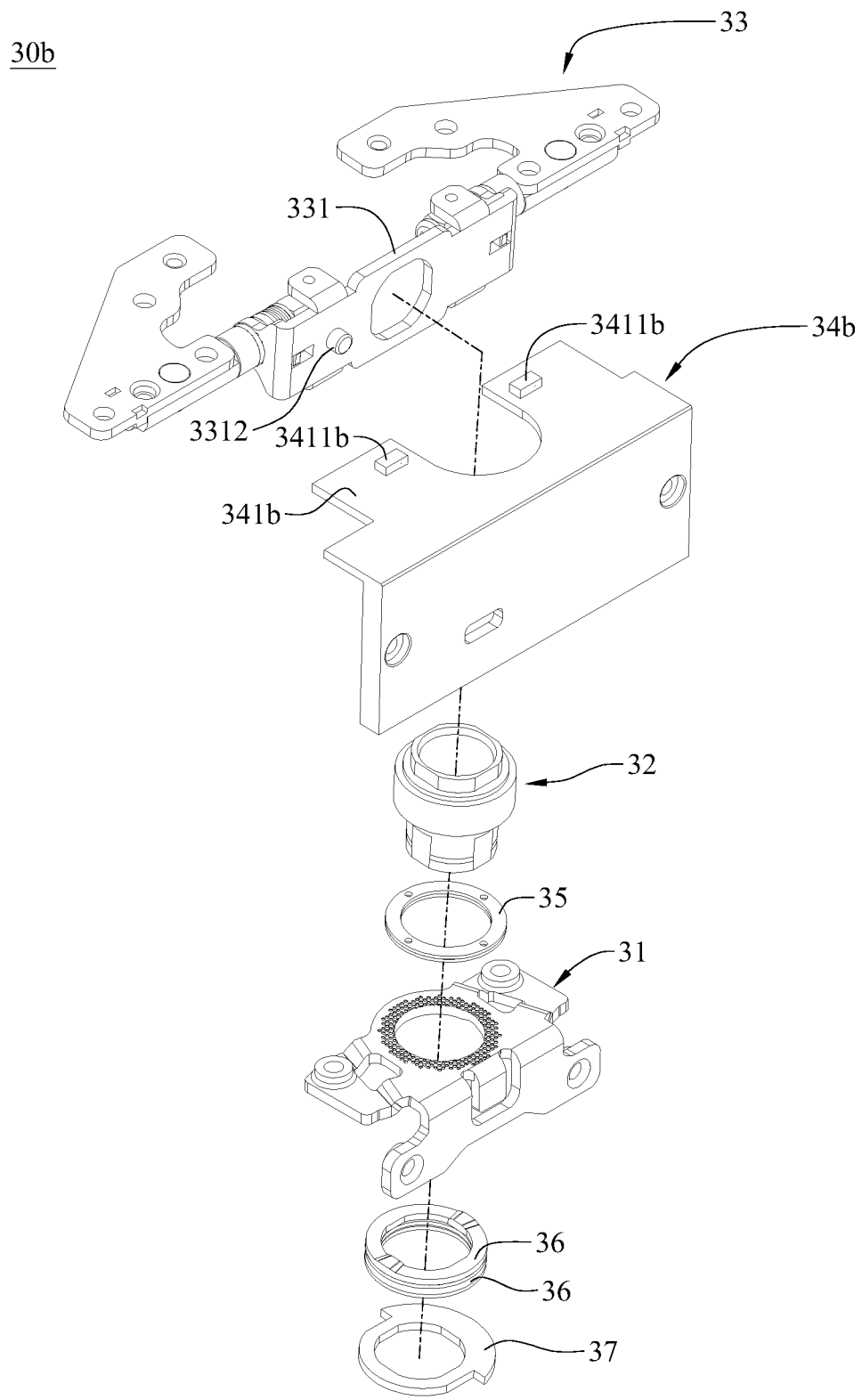
FIG. 10 is an exploded view of a hinge assembly according to still another embodiment of the disclosure.
Figure 11:
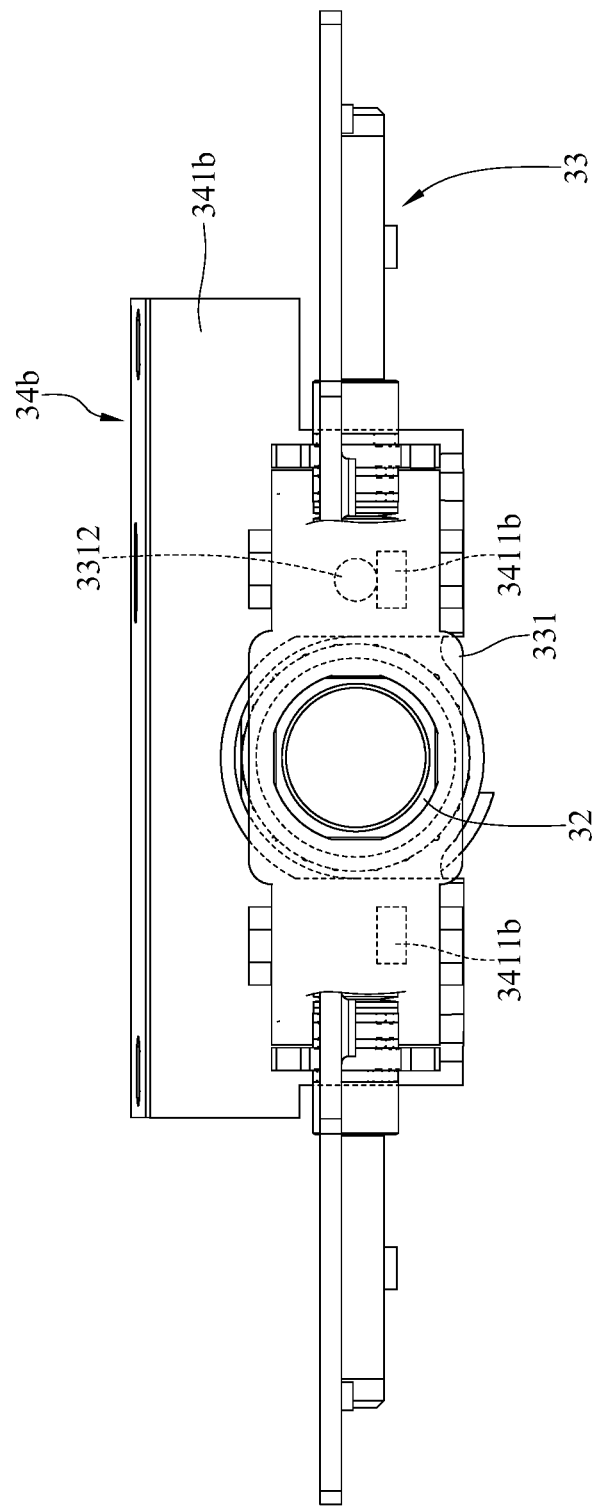
FIG. 11 is a top view of the hinge assembly in FIG. 10.

Then, referring to FIGS. 10 and 11, FIG. 10 is an exploded view of a hinge assembly 30b according to still another embodiment of the disclosure, and FIG. 11 is a top view of the hinge assembly 30b in FIG. 10.

The hinge assembly 30b of this embodiment is similar to the hinge assembly 30 with reference to FIGS. 1 to 7. The hinge assembly 30b of this embodiment also includes a fixed frame 31, a shaft 32, a rotatable frame 33, a cover 34b, a first washer 35, a plurality of second washers 36 and a positioning plate 37. The main difference between the hinge assembly 30b and the hinge assembly 30 is the structure of the cover, and thus the following paragraphs mainly introduce the cover 34b of the hinge assembly 30b, and other components of the hinge assembly 30b can be referred to the previous paragraphs with reference to FIGS. 1 to 7 and will not be repeated introduced hereinafter.

In this embodiment, a horizontal plate 341b of the cover 34b has two second positioning structures 3411b. The second positioning structures 3411b are, for example, stop blocks. The second positioning structures 3411b protrude from a surface of the horizontal plate 341b of the cover 34b facing the base 331 of the rotatable frame 33. The first positioning structure 3312 of the base 331 of the rotatable frame 33 is movable between the second positioning structures 3411b so as to limit the rotatable range of the rotatable frame 33.

In this embodiment, the rotatable range of the rotatable frame 33 is limited by the cooperation of the second positioning structures 3411b (e.g., the stop blocks) of the horizontal plate 341b of the cover 34b and the first positioning structure 3312 (e.g., the protrusion) of the base 331 of the rotatable frame 33, but the disclosure is not limited thereto; in some other embodiments, the base of the rotatable frame may have two first positioning structures (e.g., the stop blocks), and the horizontal plate of the cover may have a second positioning structure (e.g., the protrusion). As a result, the cooperation of the second positioning structure of the horizontal plate of the cover and the first positioning structures of the base of the rotatable frame may also limit the rotatable range of the rotatable frame.

Figure 12:
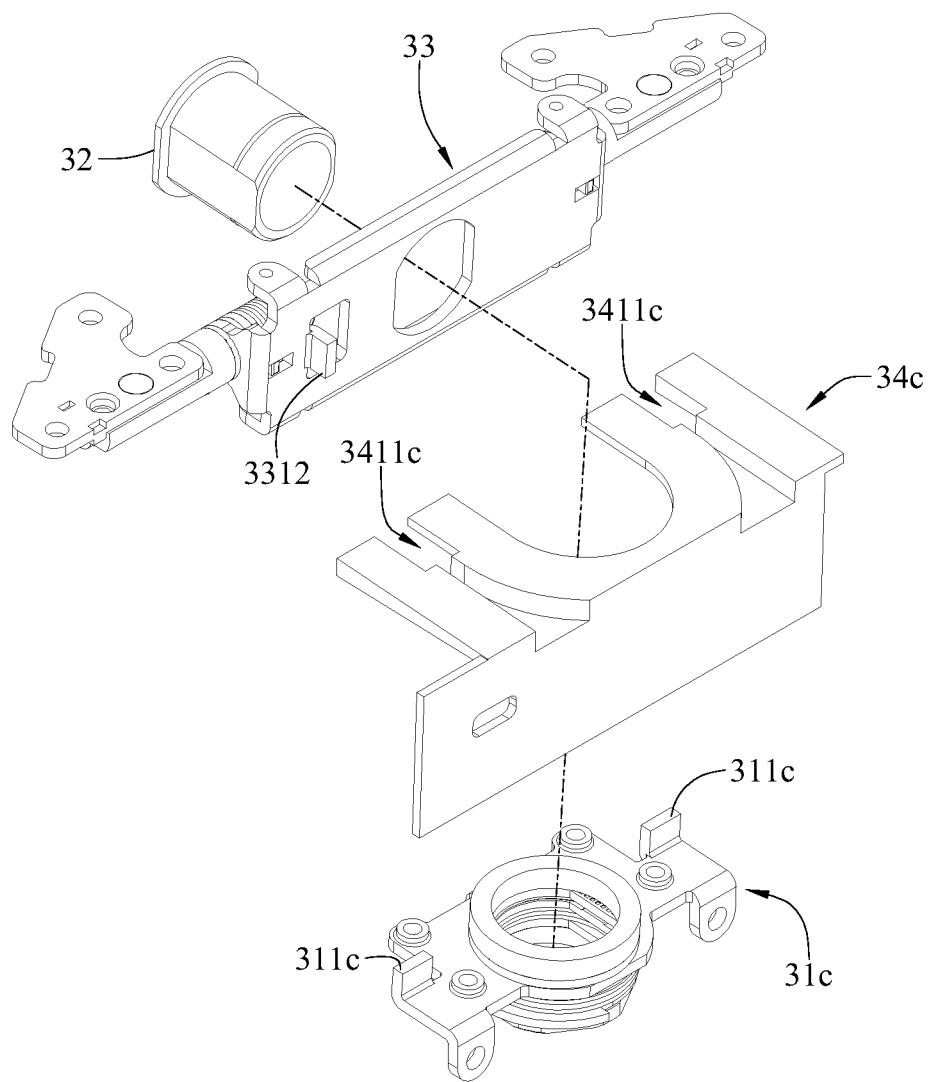
FIG. 12 is an exploded view of a hinge assembly according to yet another embodiment of the disclosure.
Figure 13:
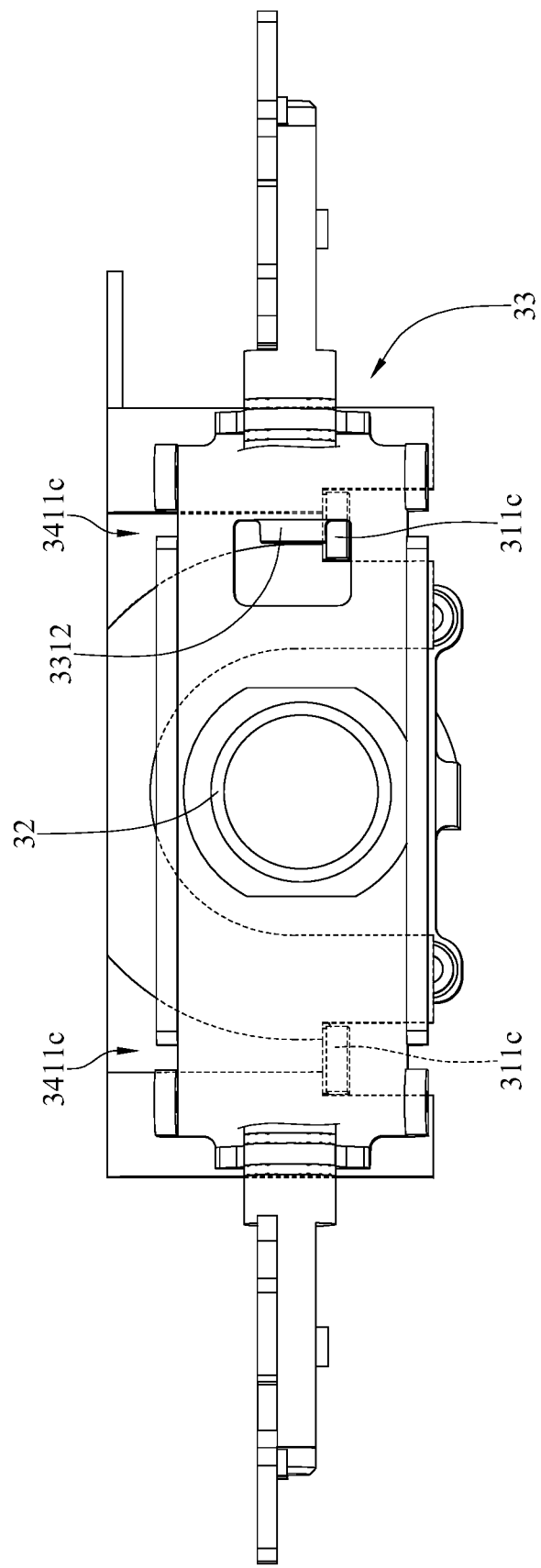
FIG. 13 is a top view of the hinge assembly in FIG. 12.

Note that the horizontal plate 341b of the cover 34b is not restricted to having the two second positioning structures 3411b (e.g., the stop blocks); in some other embodiments, the horizontal plate of the cover may not have the second positioning structures (e.g., the stop blocks). Instead, the fixed frame may have the two second positioning structures (e.g., the stop blocks). For example, referring to FIGS. 12 and 13, FIG. 12 is an exploded view of a hinge assembly 30c according to yet another embodiment of the disclosure, and FIG. 13 is a top view of the hinge assembly 30c in FIG. 12.

The hinge assembly 30c of this embodiment is similar to the hinge assembly 30b with reference to FIGS. 10 and 11, the main different between them is that the structures of the cover and fixed frame, and thus the following paragraphs mainly introduce a cover 34c and a fixed frame 31c of the hinge assembly 30c, and other components of the hinge assembly 30c will not be repeatedly introduced hereinafter.

In this embodiment, the cover 34c has two guide grooves 3411c, and the guide grooves 3411c are located around the shaft 32. The fixed frame 31c has two second positioning structures 311c (e.g., the stop blocks), and the second positioning structures 311c are respectively located in the guide grooves 3411c. The first positioning structure 3312 (e.g., the protrusion) of the rotatable frame 33 is movable between the guide grooves 3411c so as to be cooperated with the second positioning structures 311c of the fixed frame 31c for limiting the rotatable range of the rotatable frame 33.

In this embodiment, the rotatable range of the rotatable frame 33 is limited by the cooperation of the second positioning structures 311c (e.g., the stop blocks) of the fixed frame 31c and the first positioning structure 3312 (e.g., the protrusion) of the rotatable frame 33, but the disclosure is not limited thereto; in some other embodiments, the rotatable frame may have two first positioning structures (e.g., the stop blocks), and the fixed frame may have a second positioning structure (e.g., the protrusion). As a result, the cooperation of the second positioning structure of the fixed frame and the first positioning structures of the rotatable frame may also limit the rotatable range of the rotatable frame.

In addition, the quantity and the type of the second positioning structures 311c of the fixed frame 31c are not restricted in the disclosure; in some other embodiments, the fixed frame may have single one second positioning structure, the second positioning structure may be a groove, and the guide grooves of the cover may be through holes. As a result, the first positioning structure (e.g., the protrusion) of the rotatable frame may be disposed through one of the guide grooves of the cover and movably located in the second positioning structure of the fixed frame, such that two opposite inner surfaces of the second positioning structure of the fixed frame can limit the rotatable range of the rotatable frame.

According to the hinge assemblies and the casing assembly for the electronic device as described above, the cover is fixed to the first casing, and the fixed frame or the cover has the second positioning structure to be cooperated with the first positioning structure of the rotatable frame, such that the rotatable range of the rotatable frame can be limited. Since the fixed frame and the cover is fixed to the first casing instead of the shaft, when the second positioning structure of the fixed frame or the cover is hit by the first positioning structure, the fixed frame or the cover firmly fixed to the first casing enables the second positioning structure to have sufficient strength to stop the first positioning structure. Therefore, the fixed frame or the cover can permanently provide the effect of stopping the rotatable frame so as to prevent the wires from being damaged due to excessive twist.

In addition, the cooperation of the curved notch of the positioning plate and the positioning protrusion portion of the fixed frame can additionally help to limit the rotatable range of the rotatable frame.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A hinge assembly, comprising:
   a fixed frame;
   a shaft, rotatably disposed on the fixed frame;
   a rotatable frame, fixed to the shaft, wherein the rotatable frame has a first positioning structure; and
   a cover, at least partially located between the rotatable frame and the fixed frame and sleeved on the shaft;
   wherein the fixed frame or the cover has at least one second positioning structure, and the first positioning structure and the at least one second positioning structure are cooperated with each other so as to limit a rotatable range of the rotatable frame.

2. The hinge assembly according to claim 1, wherein the cover comprises a horizontal plate, the horizontal plate is located between the rotatable frame and the fixed frame, the first positioning structure is formed at a surface of the rotatable frame facing the horizontal plate, and the at least one second positioning structure is formed at a surface of the horizontal plate facing the rotatable frame.

3. The hinge assembly according to claim 1, wherein the first positioning structure is a protrusion, the at least one second positioning structure is a groove, and the first positioning structure is movably located in the at least one second positioning structure.

4. The hinge assembly according to claim 1, wherein the first positioning structure is a protrusion, the at least one second positioning structure is a stop block, the at least one second positioning structure comprises two second positioning structures, and the first positioning structure is movable between the two second positioning structures.

5. The hinge assembly according to claim 4, wherein the cover has two guide grooves, the two guide grooves are located around of the shaft, the fixed frame has the two second positioning structures, the two second positioning structures are respectively located in the guide grooves, the first positioning structure is movable between the two guide grooves so as to be cooperated with the two second positioning structures for limiting the rotatable range of the rotatable frame.

6. The hinge assembly according to claim 1, further comprising a positioning plate, wherein the positioning plate is sleeved on and fixed to the shaft, the positioning plate has an outer annular surface and a curved notch recessed from the outer annular surface, the fixed frame has a positioning protrusion portion, and the positioning protrusion portion is located in the curved notch.

7. A hinge assembly, comprising:
a fixed frame;
a shaft, rotatably disposed on the fixed frame;
a rotatable frame, fixed to the shaft, wherein the rotatable frame has a first positioning structure, and the first positioning structure is a protrusion; and
a cover, at least partially located between the rotatable frame and the fixed frame and sleeved on the shaft;
wherein the fixed frame has two second positioning structures, each of the two second positioning structures is a stop block, and the first positioning structure and the two second positioning structures are cooperated with each other so as to limit a rotatable range of the rotatable frame;
wherein the cover has two guide grooves, the two guide grooves are located around of the shaft, the two second positioning structures are respectively located in the guide grooves, and the first positioning structure is movable between the two second positioning structures located in the two guide grooves so as to be cooperated with the two second positioning structures for limiting the rotatable range of the rotatable frame.

8. The hinge assembly according to claim 7, further comprising a positioning plate, wherein the positioning plate is sleeved on and fixed to the shaft, the positioning plate has an outer annular surface and a curved notch recessed from the outer annular surface, the fixed frame has a positioning protrusion portion, and the positioning protrusion portion is located in the curved notch.

* * * * *